United States Patent
Gorobets

(10) Patent No.: US 9,436,615 B2
(45) Date of Patent: Sep. 6, 2016

(54) OPTIMISTIC DATA READ

(71) Applicant: SanDisk Technologies Inc., Plano, TX (US)

(72) Inventor: Sergey Anatolievich Gorobets, Edinburgh (GB)

(73) Assignee: SanDisk Technologies LLC, Plano, TX (US)

(*) Notice: Subject to any disclaimer, the term of this patent is extended or adjusted under 35 U.S.C. 154(b) by 0 days.

(21) Appl. No.: 14/506,124

(22) Filed: Oct. 3, 2014

(65) Prior Publication Data

US 2016/0098355 A1    Apr. 7, 2016

(51) Int. Cl.
*G06F 12/10* (2006.01)
*G06F 12/02* (2006.01)

(52) U.S. Cl.
CPC .......... *G06F 12/10* (2013.01); *G06F 12/0246* (2013.01); *G06F 12/1009* (2013.01); *G06F 2212/1024* (2013.01); *G06F 2212/152* (2013.01)

(58) Field of Classification Search
CPC . G06F 12/0246; G06F 12/10; G06F 12/1009
See application file for complete search history.

(56) References Cited

U.S. PATENT DOCUMENTS

2006/0282644 A1* 12/2006 Wong ................. G06F 12/0246
                                                                  711/206
2013/0246696 A1*  9/2013 Woodward .......... G06F 12/0862
                                                                  711/104

FOREIGN PATENT DOCUMENTS

EP           1 426 866 A1    6/2004
WO    WO 2010/078545 A1    7/2010

* cited by examiner

*Primary Examiner* — Hal Schnee
(74) *Attorney, Agent, or Firm* — Brinks Gilson & Lione

(57) ABSTRACT

A storage module may include a controller that is configured to perform a read operation to read data stored in at least one memory, where the data is associated with logical address information. In order to perform the read operation, the controller may be configured to retrieve a preliminary physical address associated with the logical address information, and initiate a data retrieval process for a first version of the data stored at the preliminary physical address prior to confirming a final physical address associated with the logical address information.

26 Claims, 9 Drawing Sheets

Logical Group   LG$_i$   | 0 | 1 | ... | k | k+1 | ... | N-1 |

Physical Group
(Metablock)    MB$_j$   | 0 | 1 | ... | k | k+1 | ... | N-1 |

OPTIMISTIC DATA READ

BACKGROUND

Storage modules may manage data storage in response to host commands received from a host. When a host read command is received, the storage module may determine a physical location at which data associated with the host read command is stored. For some configurations, the storage module may convert host address information included in the host read command to physical address information that identifies the physical location. The storage module may use multiple tables or other address data structures to map the host address information with the physical address information.

SUMMARY

Embodiments of the present invention are defined by the claims, and nothing in this section should be taken as a limitation on those claims. By way of example, the embodiments described in this document and illustrated in the attached drawings generally relate to a storage module and related methods of a controller that executes context commands on a communications bus in accordance with a cache sequence while a memory module performs internal memory operations.

In one example, a storage module may include at least one memory and control circuitry in communication with the at least one memory. The control circuitry may include a plurality of modules configured to perform a read operation to read data stored in the at least one memory. The plurality of modules may include an address lookup module configured to: identify logical address information associated with the data; and retrieve a preliminary physical address associated with the logical address information from a first set of a plurality of address data structures, where the plurality of address data structures includes a primary address data structure and at least one secondary address data structure, and where the first set includes at least the primary address data structure. The address lookup module may also be configured to confirm a final physical address associated with the logical address information, where the confirmation is based on a query of a second set of the plurality of address data structures, and where the second set includes one or more of the at least one secondary address data structure. The plurality of modules may further include a data read module configured to: initiate a data retrieval process for a first version of the data prior to confirmation of the final physical address by the address lookup module, where the first version of the data is stored at the preliminary physical address. When the final physical address matches the preliminary physical address, the data read module may be configured to complete the read operation using the first version of the data. In addition, when the final physical address does not match the preliminary physical address, the data read module may be configured to terminate the initiated data retrieval process and initiate a subsequent data retrieval process for a second version of the data stored at the final physical address.

In another example, a method of accelerating a logical-to-physical address translation may include: performing the following in a storage module having at least one memory: receiving, from a host system, a host request identifying logical address information for data stored in the at least one memory; reading a preliminary physical address associated with the logical address information from a first data structure of a plurality of address data structures; initiating a data retrieval process for a first version of the data stored at the preliminary physical address prior to confirming a final physical address associated with the logical address information; while continuing with the data retrieval process, querying a second address data structure of the plurality of address data structures to confirm the final physical address, where the second address data structure is different from the first address data structure; and when the final physical address does not match the preliminary physical address, terminating the initiated data retrieval process and initiating a subsequent data retrieval process for a second version of the data stored at the final physical address.

In sum, a storage module may be configured to initiate a data retrieval process for data associated with logical address information before the storage module confirms a final physical address for the data. In doing so, execution of read operations, including those performed in response to host read commands and as well as internally-initiated read operations, may be accelerated and overall efficiency for executing read operations may be improved.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 2 is a schematic diagram of the mapping between logical groups and metablocks.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes a storage module that is configured to initiate a data retrieval process for data stored in a memory before the storage module confirms a final physical address for the data associated. The data retrieval process may be initiated in response to a host read request received from a host. Alternatively, the data retrieval process may be initiated as part of an internal background process of the storage module.

Figure 1:
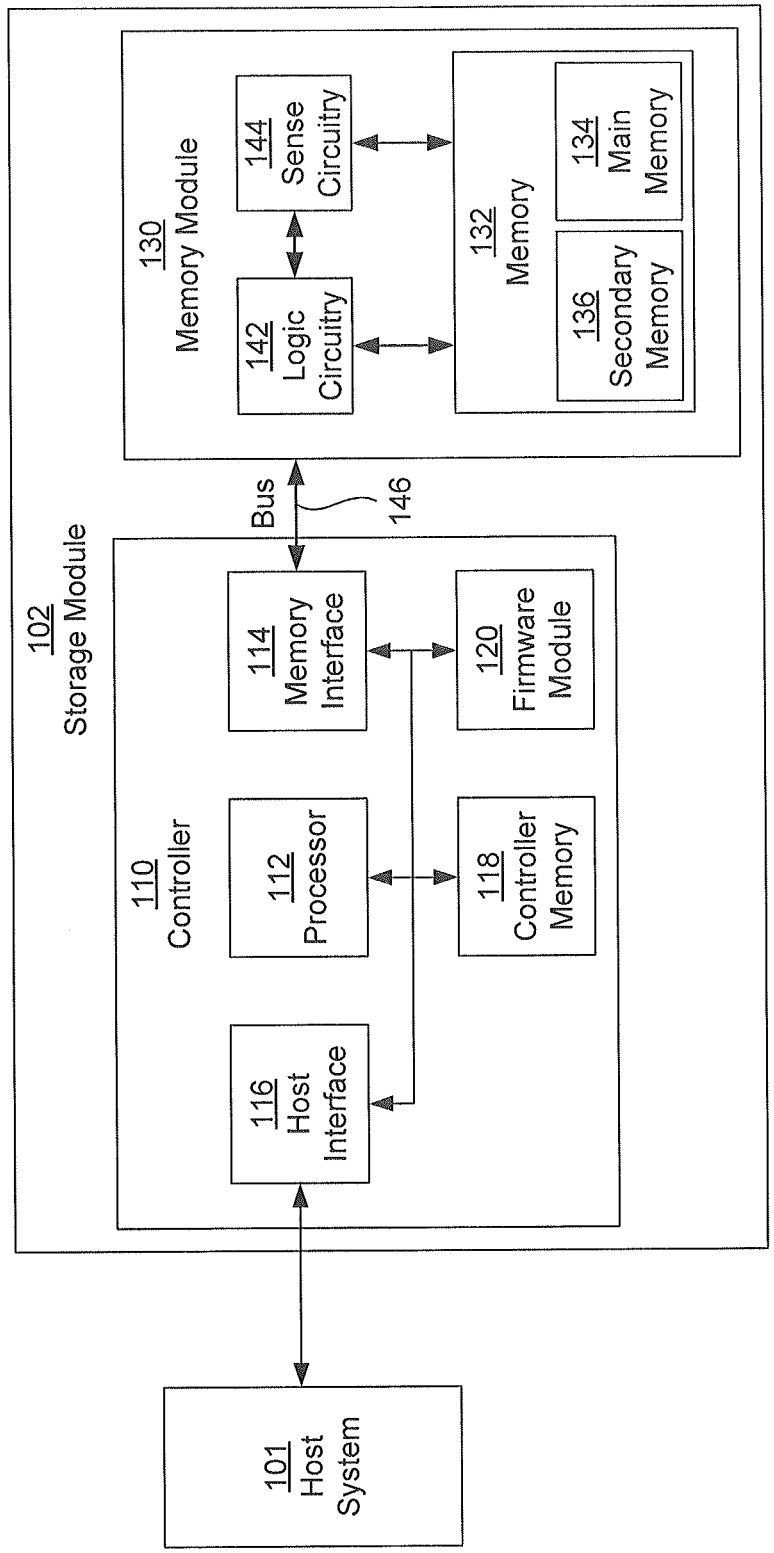
FIG. 1 is a block diagram of an example storage system.

FIG. 1 shows a block diagram of an example system 100 that includes a host system 101 and a storage module 102. The host system 101 may be configured to store data into and retrieve data from the storage module 102. The storage module 102 may be configured to perform memory management functions that control and manage the storage and retrieval of the data. As shown in FIG. 1, the storage module 102 may include a controller or control circuitry 110 and a memory module 130. Depending on the configuration of the storage module 102, the controller 110 and the memory module 130 may be on the same or different substrates.

The controller 110 may include a processor or processor circuit 112 that is configured to perform and/or control the performance of at least some of the memory management functions. The processor 112 may include a single processor or a plurality of processors configured to perform various types of processing, such as co-processing, multi-processing, multi-tasking, parallel processing, remote processing, distributed processing, or the like, in order to perform the memory management functions. The processor 112 may be a microprocessor, a microcontroller, an application specific integrated circuit (ASIC), a field programmable gate array, a digital logic digital circuit, other now known or later developed circuitry having logical processing capability, or combinations thereof. In addition or alternatively, the processor may be configured to execute program instructions that may be part of software, micro-code, firmware, stored in hardware, or the like in order to perform at least some of the memory management functions.

In addition, the controller 110 may also include a memory interface 114 that interfaces with the memory module 130. The controller 110 may also include a host interface 116 that configures the storage module 102 operatively in communication with the host system 101. As used herein, the phrase "operatively in communication with" could mean directly in communication with or indirectly in communication with through one or more components, which may or may not be shown or described herein. The processor 112, through or using the host interface 116, may receive host requests, such as host read and write requests, from the host system 101, and send, through or using the host interface 116, responses to the host read and write requests to the host system 101. Additionally, the host interface 116 may take any suitable form, such as, but not limited to, an eMMC host interface, a UFS interface, and a USB interface, as examples.

Also, some configurations of the controller 110 may include controller memory 118, which may be separate or "off-chip" from memory in the memory module 130, and which may include one or more various types of memory structures or technologies of volatile memory, non-volatile memory, or combinations thereof. The processor 112 may use or access the controller memory 118 to perform its associated memory management functions. For example, software and/or firmware including program instructions may be stored in the controller memory 118, which the processor 112 may execute to perform one or more memory management functions. In addition or alternatively, data may be temporarily stored in the controller memory 118 before being stored in the memory module 130 or sent to the host system 101.

The controller 110 may also include a firmware module 120. The firmware module 120 may include software and/or a set of executable program instructions, which may be stored in the controller memory 118 and/or which the processor 112 may execute or use to perform one or more of the memory management functions.

The memory module 130 may include memory 132 configured to store data or other information in the storage module 102. The memory 132 may include a plurality of memory elements or cells, each configured to store one or more bits of data. In addition, the memory 132 may include volatile memory, non-volatile memory, or combinations thereof. In addition or alternatively, the memory 132 may include a single type of memory (such as a single type of volatile memory or a single type of non-volatile memory) or different types of memory (such as different types of volatile memory, different types of non-volatile memory, or combinations thereof).

In addition, the memory 132 may be a single physical space (such as a single die or a single chip) in which the controller 110 may use the same bus or channel to access the single physical space. Alternatively, the memory 132 may include multiple, different physical spaces (such as multiple dies or multiple chips) in which the controller 110 may use different buses or different channels to access the different physical spaces.

In addition, the memory 132 may have an organizational arrangement or hierarchy under which the memory elements or cells of the memory 132 may be organized. The controller 110 may be configured to store data and/or access stored data in accordance with the organizational arrangement or hierarchy.

For some example configurations of flash memory, the memory elements may be divided or organized into blocks, with each block containing the minimum number of memory elements that may be erased together. Each block may be further divided into a number of pages, with each page being a unit of programming or reading. Each individual page may further be divided into segments, with each segment containing the fewest number of memory elements that may be written at one time as a basic programming operation. Additionally, for some example configurations, multiple blocks and pages may be distributed across multiple arrays and operated together as metablocks and metapages, respectively. Alternatively, the distribution of blocks and pages may be confined to a single array. Data may be stored in a block and/or a metablock in various ways, including non-contiguously (randomly) or contiguously. As used herein, and unless otherwise specified, the terms "block" and "metablock" and the terms "page" and "metapage" may be used interchangeably and/or referred to collectively as "metablock" and "metapage" respectively, without concern for whether the block/metablock and page/metapage span a single array or multiple arrays.

The memory elements may be configured as single-level cells (SLCs) that store a single bit of data per cell, multi-level cells (MLCs) that store multiple bits of data per cell (e.g., two bits of data per cell), triple-level cells (TLCs) that store three bits of data per cell, or combinations of SLCs, MLCs, and TLCs. Accordingly, a block or page of memory elements may respectively store a single block or page of data or multiple blocks or pages of data, depending on whether the memory elements are configured as SLCs, MLCs, and/or TLCs. Whether a memory element is a SLC, a MLC, or a TLC may depend on the number of bits the controller 110 determines to program into the memory element. For example, the controller 110 may be configured to program a single bit of data into a memory element, in which case the memory element is configured as a SLC. Accordingly, each of the memory elements may be configured in a SLC mode, a MLC mode, or a TLC mode, as determined by how the controller 110 programs the respective memory elements.

In addition, for some example configurations, the memory may include a single area. For other example configurations, the memory 132 may be divided or separated into different memory areas, including a main memory 134 and a secondary memory 136, as shown in FIG. 1. The main memory 134 and the secondary memory 136 may be different in that they may be of different memory types, may be located in different physical spaces, have different cell configurations, or some combination thereof.

For some example flash memory applications, the secondary memory 136 may be a binary cache 136. The main memory 134 may have a higher bit-per-cell storage density than the binary cache 136. That is, the memory elements of the main memory 134 may be configured as MLCs, whereas the memory elements of the binary cache 136 may be configured as SLCs. In alternative example configurations, the memory elements of the main memory 134 may also be configured as SLCs. In addition, the binary cache 136 may be configured to allow for a finer granularity of writes than for the main memory 134. The finer granularity may be more compatible with the granularity of logical data units from a host write request. In addition or alternatively, the main memory 134 may be configured to store logical data units sequentially, whereas the binary cache 136 may or may not store logical data units sequentially. Accordingly, fragments of data (e.g., less than a metablock or logical group of data) may be stored in the binary cache 136. For some situations, the data fragments may be subsequently reassembled in sequential order in the blocks in the main memory 134.

The memory module 130 may further include logic circuitry 142 configured to control and/or manage the storage of data in the memory. The logic circuitry 142 may provide an interface between the controller 110 and the memory 132. The logic circuitry 142 may control and/or manage the storage of data in the memory 132 in response and/or according to context instructions or commands, such as sense, program, and/or erase commands, received from and/or generated by the controller 110. The logic circuitry 142 may be configured to perform various memory management functions to control and/or manage the data storage, including, but not limited to, addressing, data transfer, sensing, row and column decoding, and/or gate biasing. Additionally, the memory controller 142 may be implemented in hardware, including one or more processors, hardware logic, buffers, voltage generators, and/or other circuitry to perform the functions of the memory controller 142.

The memory module 130 may further include sense circuitry 144, which may include sense amplifiers configured to sense data stored in the memory 132 and latches configured to store the sensed data, which may then be transferred to the controller 110.

FIG. 1 shows the controller 110 and the logic circuitry 142 as separate components of the storage module 102. However, for alternative example configurations, the logic circuitry 142 and/or the functions performed by the logic circuitry 142 may be incorporated into the controller 110, and the controller 110 may be configured to communicate directly with the memory 132 and/or the sense circuitry 144.

The storage module 102 may also include a communications bus 146 that provides a communications link between the controller 110 and the memory module 130. The communications bus 146 may be used by the controller 110 and the memory module 130 to communicate data, commands, or other information or messages in order to execute host requests or commands received from the host system 101, such as host read and write requests.

When the storage module 102 receives a host read request from the host system 101, the storage module 102 may be configured to perform a read operation that includes a plurality of processes in order to execute or carry out the host read request. Such processes may include: address translation; data retrieval; and host communication.

Address Translation

The host system 101 and the storage module 102 may use different addressing schemes for managing the storage of data. For example, when the host system 101 wants to write data to the storage module 102, the host system 101 may assign a logical address (also referred to as a logical block address (LBA)) to the data. Similarly, when the host system 101 wants to read data from the storage module 102, the host system 101 may identify the data it wants read by the logical address. The host system 101 may utilize a logical addressing scheme in which a host file system maintains a logical address range for all LBAs assigned or recognized by the host system 101. In addition, for some example configurations, the host system 101 may address data in units of logical sectors. Accordingly, host read and write requests may be requests to read and write a segment comprising a string of logical sectors of data with contiguous addresses.

In contrast to the host system's logical addressing scheme, the storage module 102 may store and access data according to a physical addressing scheme that uses physical addresses different from the logical addresses assigned by the host system 101 to store and access data. To coordinate the host system's logical addressing scheme with the storage module's physical addressing scheme, the storage module 102 may perform address translation in which the storage module 102 translates a logical address included in a host request to a physical address for storage or retrieval of data. As previously described, the memory 132 may be organized or arranged into metablocks. Accordingly, when the memory device 102 performs address translation, the physical address that the memory device 102 determines may identify the metablock, the plurality of metablocks, and/or the physical sectors within a metablock, at which the data is stored.

For some example configurations, the logical addresses (LBAs) may be grouped into logical groups (LGs), and the logical groups may be mapped to the metablocks. FIG. 2 shows a schematic diagram of the mapping between logical groups (LG) and metablocks (MB). Each logical group may be mapped to a unique metablock. Accordingly, as shown in FIG. 2, a metablock may have a N-number of physical sectors for storing N-logical sectors of data associated with a logical group. For some example configurations, the logical sectors of data may be stored in the physical sectors in contiguous and sequential logical order 0, 1, . . . N−1. Alternatively, N logical sectors of data may be stored randomly or discontiguously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 2, a metablock $MB_j$ may store data associated with a logical sector k in its first physical sector 0. When the last logical sector N-1 is reached, the logical sectors may wrap around such that the first logical sector 0 is stored contiguously and sequentially after logical sector 0, and the logical sector k-1 is stored in the last physical sector N-1. A page tag may be used to identify any offset, such as by identifying the starting logical sector address of the data stored in the first physical of the metablock.

Referring back to FIG. 1, when the storage module 102 receives a host request, the controller 110 may perform an initial parsing operation to determine a logical group number and offset for the data in accordance with the mapping shown and described with reference to FIG. 2. The controller 110 may then use the logical group number and offset to identify the metablock and/or the physical sector within the metablock at which the data is stored.

The metablocks in the main memory 134 may include or qualify as intact blocks and update blocks. A metablock is as an intact block when it completely and (and sometimes sequentially) stores a logical group of data without any of the data being obsolete (i.e., all N physical sectors of the metapage store N logical sectors of data and none of the sectors of data are obsolete). A metablock is an update block when it stores one or more logical sectors of updated data. When an update block is not completely filled with updated data, the update block may be open or available to receive further logical sectors of updated data associated with the same logical group. When an update block is completely filled, it may be closed or no longer available to receive further logical sectors of updated data, at which point the update block may become an intact block.

For example configurations of the memory 132 that includes both the main memory 134 and the binary cache 136, data may be stored in binary cache blocks of the binary cache 136 instead of in metablocks of the main memory 134. The controller 110 may be configured to evaluate various factors or criteria for determining whether certain data is stored in the main memory 134 or in the binary cache 136. One factor may include whether the data to be stored is a data fragment. A data fragment may be data that has a size that is less than a size of a metapage, such that the writing of the data would constitute a partial-page write. To illustrate, suppose a metapage includes eight physical sectors. If certain data to be written only spans two sectors, then that data may be identified as a data fragment for storage in the binary cache 136. Factors other than or in addition to the size of the data may be used to determine whether data is stored in the main memory 134 or the binary cache 136. For example, if an update block currently exists for the data and is available for storage of the data, even if the data qualifies as a data fragment, the controller 110 may determine to store the data in the available update block in the main memory 134 rather than in the binary cache 136.

For some example configurations, fragment headers may be stored with associated data fragments in the binary cache 136. The fragment headers may include a logical group number that identifies the logical group to which the associated data fragment belongs, a sector offset that identifies a particular sector within the logical group, a length identifier that identifies a length of the associated data fragment, and one or more overwrite indicators or flags that identify whether the associated data fragment overwrites corresponding data stored in an update block.

For some situations, in response to a host request to write data, the controller 110 may store the data in both the main memory 134 and the binary cache 136. For example, if the data to be stored is greater than a metapage, the controller 110 may store a first portion having the size of a metapage in an update block in the main memory 134, and a second, remaining portion of the data in the binary cache 136. To illustrate, suppose data to be written requires nine physical sectors. The controller 110 may store eight of the nine sectors of the data in an update block and the remaining sector of data in the binary cache 136.

In addition or alternatively, the controller 110 may store overlapping data in the main storage 134 and the binary cache 136. As an illustration, suppose the controller 110 stores eight sectors of data in a metablock in the main memory 134 in response to a first host write request. Suppose further that the controller 110 receives a second host write request for an update of two of the eight sectors. The controller 110 may store the updated data as a data fragment in the binary cache 136. As another illustration, the controller 110 may receive a first host write request in which two sectors of data are stored as a data fragment in the binary cache 136. The controller 110 may then receive a second host write request for storage of eight sectors, two of which may be for an update of the two sectors of data stored in the binary cache 136.

Alternatively to being stored in the memory 132, some data may be stored in the controller memory 118. Such data may include data that is temporarily stored in the controller memory 118 before it is sent to either the memory 132 or the host system 101 (e.g., the final destination address of the data is not the controller memory 118), or data that is intended to be permanently stored (e.g., its final destination address is the controller memory 118).

In order to keep track of where in the storage module 102 data is stored, the storage module 102 may maintain a directory system that maps the relationships or associations between logical addresses and physical addresses. The directory system may include a plurality of address data structures (such as tables, listings, logs, or databases as examples) that track and identify the logical-physical address relationships or mappings. The plurality of address data structures may include a primary address data structure (also referred to as a Group Address Table (GAT)) and at least one secondary address data structure. The controller 110 may access the primary and secondary data structures to determine where in the storage module 102 the most recent version of the data is stored.

The primary address data structure (GAT) may provide a primary logical-physical address mapping for logical addresses included in the logical address range recognized by the host system 101. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group.

The at least one secondary address data structure may provide logical-physical address mapping for data fragments stored in the binary cache 136, logical-physical address mapping for changes to data, such as data stored in update blocks, and/or some combination thereof.

One example secondary address data structure, referred to as GAT Delta, may track changes to entries and/or include a listing of changed entries in the mappings of the GAT. As previously described, when data is re-written, the new version of the data may be written to another part of the main memory 134, such as in an update block. GAT Delta may map data stored in the update blocks with associated logical groups. For some example configurations, GAT Delta may be part of a Master Index Page (MIP) that, in addition to GAT Delta, includes a Free Block List (FBL) and/or the GAT. The Free Block List may be a list that identifies blocks that are available for storage of data (e.g., for allocation as an update block) and that may be later mapped to logical groups.

Another secondary address data structure may be a Binary Cache Index (BCI) that tracks data fragments in the binary cache 136. The Binary Cache Index may include a plurality of binary cache indices that associate or map the logical groups to which the data fragments belong to the physical locations or addresses in the binary cache 136 at which the data fragments are stored. For some example configurations, the controller 110 may query the BCI for a given data fragment, and in response receive a pointer or other identifier identifying a binary cache block and sector number along with a length of the data fragment.

Other secondary address data structures may be possible. For example, another secondary address data structure may map data stored in the controller memory 118 with associated logical groups.

The primary and secondary address data structures may be stored in any of the memories of the storage module 102, including the controller memory 118, the main memory 134, and the binary cache 136. In addition or alternatively, some or all of the primary and secondary address data structures may be stored external to the storage module 102, such as in the host system 101. Additionally, for some example configurations, at any given time or for any duration, copies of one or more of the address data structures, or at least portions of the address data structures, may be generated so that for a given address data structure, there are two versions stored in two different locations in the storage module 102. To illustrate, for a given address data structure, one version may be stored in the memory 132, either in the main memory 134 or the binary cache 136, and another may be stored in the controller memory 118, such as in a RAM portion of the controller memory 118. As another illustration, for a given address data structure, one version may be stored external to the storage module 102, and another version may be stored internal to the storage module 102, such as in the controller memory 118 or in the memory 132. For some example configurations, a main or primary version of the address data structure may be stored in the memory 132 or in the host system 101, and when the controller 110 determines to query or update the address data structure, the controller 110 may create a copy or load a second version in the controller memory 118. If any updates on the copy are made, the version stored in the memory 132 may be similarly updated. Various ways or locations in which the primary and secondary address data structures are stored may be possible.

Figure 3:
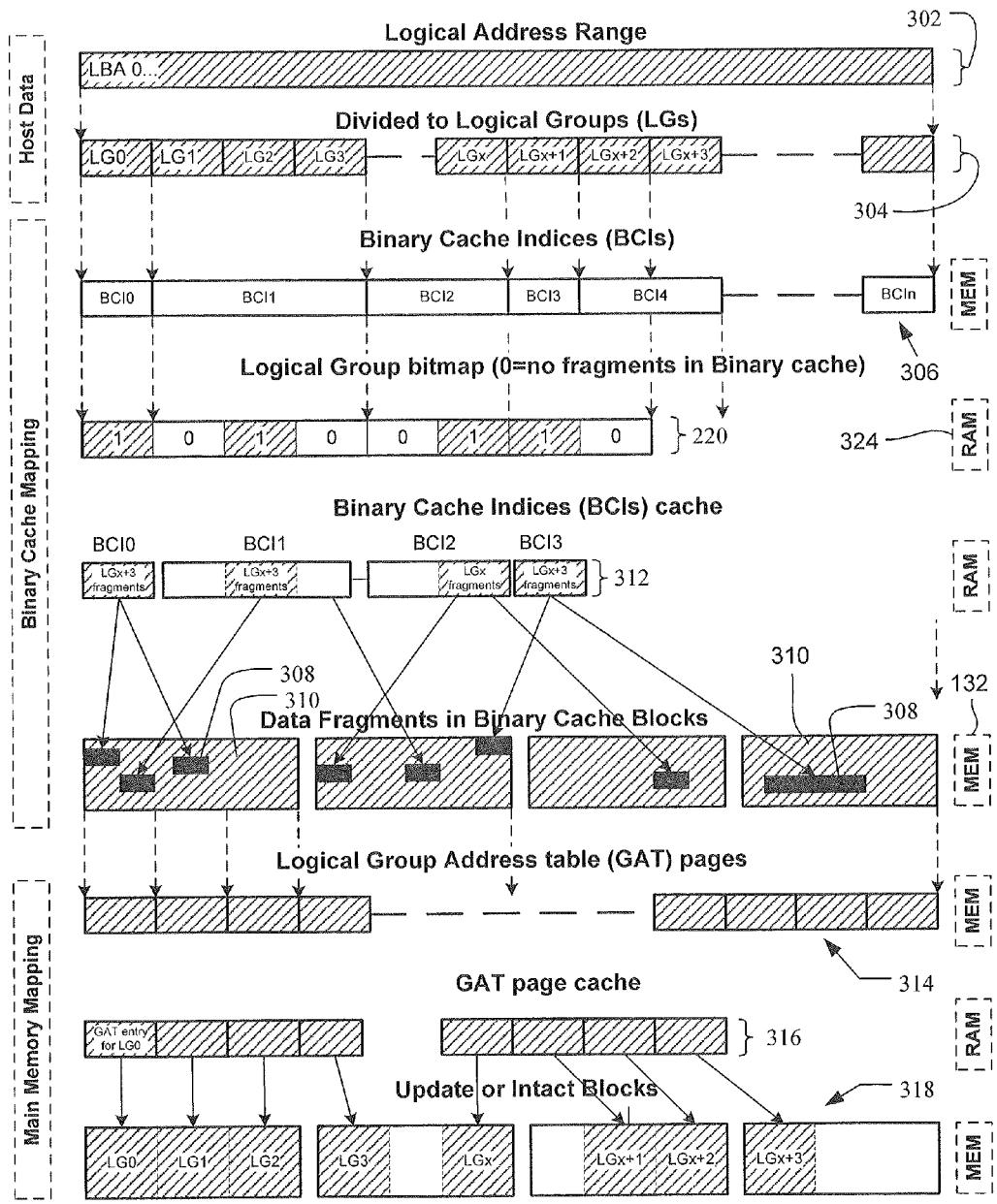
FIG. 3 is a schematic diagram of an example primary and secondary address data structure arrangement.

FIG. 3 shows a schematic diagram of an example primary and secondary address data structure arrangement for flash memory. As shown in FIG. 3, a logical address range 302 for all logical block addresses (LBAs) may be maintained in a host file system utilized by the host system 101. These LBAs may be grouped into logical groups (LGs) 304. As previously described, certain data fragments 308 associated with logical groups 304 may be written into the binary cache 136 rather than to the main memory 134. For the data fragments that 308 that are stored in the binary cache 136, binary cache indices 306 may map the logical groups with which the data fragments 308 are associated to the binary cache blocks 310 of the binary cache 136 in which the data fragments 308 are stored. As indicated in FIG. 3, the binary cache indices 306 may be stored in the memory (MEM) 132, either in the main memory 134 or in the binary cache 136. Additionally, a copy of all or a portion of the binary cache indices, identified as BCI cache 312 in FIG. 3, may be maintained (cached) in a RAM portion 324 of the controller memory 118 due to frequent use or recent use. FIG. 3 shows the copy of the binary cache indices 312 maintained in the RAM 324 pointing to the data fragments 308 stored in the binary cache blocks 310. The binary cache indices 306 stored in the binary memory 132 may similarly point to data fragments 308 stored in the binary cache blocks 310.

The primary address data structure (GAT), which includes GAT pages 314, may be stored in the memory 132. In addition, a copy of some or all of the GAT pages 314 in addition to GAT Delta, identified collectively as GAT page cache 316 in FIG. 3, may be maintained (cached) in RAM 324. Also, for the example arrangement shown in FIG. 3, GAT Delta may also be maintained in RAM 324, although all or a portion of GAT Delta may be additionally or alternatively stored in the main memory 134 for other example arrangements. FIG. 3 shows the GAT pages and GAT Delta 316 maintained in RAM 324 pointing to data stored in update and intact blocks 318 of the main memory 134. The GAT pages 314 stored in the memory 132 may similarly point to data stored in the update and/or intact blocks 318.

At any given time, entries in the primary address data structure (GAT) may not map a logical group to a physical location in which data belonging to the logical group is stored, and/or may not map a logical group to a physical location in which the most recent version of the data belonging to the logical group is stored. Where the primary address data structure has a logical-to-physical mapping that is out-of-date, at least one of the secondary address data structures may provide the most up-to-date mapping. Additionally, the secondary address data structures may provide one or more indications, such as through pointers or time stamps, that indicate whether the logical-physical mapping maps to the most recent version of the data.

So that the entries in the primary address data structure are as up-to-date as possible, the controller 110 may be configured to synchronize the mappings in the primary address data structure with the mappings in the secondary address data structures so that the primary address data structure provides mappings to the most recent versions of the data. However, at any given time, a host read request may be received when the primary address data structure has not been synchronized with the secondary address data structures.

In order to ensure that the data that is sent back to the host is the most recent version, the controller 110 may be configured to query all or at least one of the secondary address data structures before retrieving data from the memory module 132 and/or responding to the host. Upon querying both the primary and the secondary address data structures, the controller 110 may determine the logical-physical mapping and/or retrieve the physical address that identifies where the most recent version of the data is stored. As such, by querying all or at least one of the secondary address data structures in addition to the primary address data structure, the controller 110 may ensure that the most recent version of the data is sent back to the host system 101.

Data Retrieval and Host Communication

Data retrieval may be performed by the storage module 102 in order for the controller 110 to retrieve the stored data from the memory 132. After the controller 110 translates a logical address to a physical address, the controller 110, in conjunction with the logic circuitry 142 and/or the sense circuitry 144, may perform a plurality of actions to retrieve the data stored in the memory 132. Such actions may include and/or be grouped into the following: pre-sensing, sensing, and data transfer.

Pre-sensing actions may include any actions performed following address translation that initiate the data retrieval process and prepare the necessary components of the storage module 102 for the subsequent sensing and data transfer operations. One of the pre-sensing actions may include a subsequent address translation process. For example, during the initial address translation, the physical address that the controller 110 identifies (e.g., a metablock number) may constitute an abstract physical address. During the subsequent address translation process, the controller 110 may convert the abstract physical address to an actual physical address that identifies the physical aspects of the memory, such as by plane, die, bank, physical block, offset, etc., in which the data is stored.

In addition or alternatively, pre-sensing actions may include context command generation. Context commands may include commands that the controller 110 executes or issues to the internal controller 142 in order to retrieve data stored at a particular physical address. In an example configuration, the controller 110 may generate at least one set of context commands associated with the host read command, with each set including a pair of a sense command and a data transfer command. The sense command may instruct the internal controller 130 to sense data stored at a particular physical address identified in the sense command. The data transfer command may be generated to cause the data that is sensed to be transferred on the bus 146 to the controller 110.

Depending on the size of the data to be read and/or how or where in the memory 132 the data is stored, a single pair or multiple pairs of context commands may be generated, issued, and/or executed. Additionally, if there are a plurality of outstanding context commands to be issued, whether they are for retrieving data for a single host read request or a plurality of host read requests, the controller 110 may perform sequencing in order to determine an order in which the context commands are issued or executed.

In addition, prior to subsequent data translation and/or context command generation, the controller 110 may perform one or more pre-sensing operations to ensure that the various components involved in the subsequent sensing and data transfer operations, including the memory interface 114, the internal controller 142, the communications bus 146, and/or buffers in the controller memory 118, are ready and/or available to perform the sensing and data transfer operations. During these pre-sensing operations, various low-level work orders identifying sense operations, toggle operations, chip enables, die selections, delays or other timing between commands and/or data transfers, characteristics of the data to be transferred (e.g., physical address information, size of the data to be transferred), etc. may be generated.

The above-described actions are merely exemplary and other actions or operations may additionally or alternatively be performed prior to sensing in order to prepare the various components of the storage module 102 for subsequent sensing and data transfer operations.

After any pre-sensing actions are performed, the controller 110, via the memory interface 114, may issue one or more sense commands on the bus 146 to the internal controller 142 to initiate data sensing. In response to receipt of a sense command, the logic circuitry 142, using the sense circuitry 144, may perform a corresponding sense operation on the memory 132. For flash memory applications, a typical flash operation may include selecting a wordline corresponding to a page of memory elements and performing current sensing on bitlines through application of one or more bias voltages. The data that is sensed upon performance of the sense operation may be stored in latches within the sense circuitry 144.

After the data is sensed and stored in the latches, the controller 110 may then execute the corresponding data transfer command (otherwise referred to as toggling the bus 146), which may cause the sensed data stored in the latches to be transferred on the bus 146 to the controller 110. As is typical, after the data is transferred to the controller 110, one or more post data transfer operations may be performed by the controller 110 (such as decoding, error correction, and data sequencing as examples) before the data may be temporarily stored in a buffer or cache portion of the controller memory 118 of the controller 110. After all or at least some of the data associated with a host read request is stored in the controller 110, the controller 110 may send the data to the host and release any resources allocated to executing the host read request.

For purposes of the present description, the pre-sensing, sensing, and data transfer actions that are performed for the controller 110 to retrieve data associated with a host read request may be classified or grouped into data retrieval initiation and data retrieval completion stages of the data retrieval process. For some example configurations, the data retrieval initiation stage may consist of the pre-sensing and sensing actions, and the data completion stage may consist of the data transfer actions. For other example configurations, the data retrieval initiation stage may consist of the pre-sensing actions, and the data completion stage may consist of the sensing and data transfer actions. In other words, the pre-sensing actions may be part of the data retrieval initiation stage, the data transfer actions may be part of the data retrieval completion stage, and the sensing actions may be part of either the data retrieval initiation stage or the data retrieval completion stage, depending on the configuration.

As previously described, the controller 110 may be configured to query all or at least one of the secondary address data structures, in addition to querying the primary address data structure, before retrieving data and/or sending the data to the host system 101 in order to ensure that the data sent back to the host system 101 is the most recent version of the data. For some situations, the likelihood that the entries in the primary address data structure are not up-to-date may be relatively low. In other words, when the controller 110 queries the primary address data structure to retrieve a physical address, it may be more likely than not that the physical address that primary address data structure returns identifies the physical location of the most recent version of the data. Accordingly, overall efficiency for execution of host read requests may be improved and execution of the host read request may be accelerated where the controller 110 begins initiation of the data retrieval process before it completes its query of the secondary address data structures and confirms the final physical address for the data.

In one example configuration, when the controller 110 receives a host read request identifying logical address information, the controller 110 may query a first set of one or more of the address data structures to obtain a preliminary physical address associated with the logical address information. The preliminary physical address may or may not identify where the most recent version of data associated with the logical address information is stored. That is, the first set of address data structures may include an insufficient number of address data structures for the controller 110 to query in order for the controller 110 to know with a sufficient degree of certainty whether or not the preliminary physical address identifies the physical location where the most recent version of the data is stored.

After obtaining the preliminary physical address, the controller 110 may initiate the data retrieval process using the preliminary physical address. Before sending data stored at the preliminary physical address to the host system 101, the controller 110 may determine or confirm a final physical address that identifies where the most recent version of the data is stored. To determine the final physical address, the controller 110 may query a second set of the address data structures. The second set of address data structures, in combination with the first set, may provide a sufficient number of address data structures for the controller 110 to query in order for the controller 110 to know with a predetermined degree of certainty whether or not the preliminary physical address identifies the physical location where the most recent version of the data is stored.

The query of the second set may return information that identifies either a logical-physical address mapping that maps to a second preliminary physical address, or that such a logical-physical mapping (or a physical address associated with the logical address information) does not exist in any of the address data structures of the second set. Based on the information returned from the query of the second set, the controller 110 may determine whether the preliminary physical address initially determined identifies the physical location at which the most recent version of the data is stored. In particular, if the query of the second set of address data structures does not identify a logical-physical mapping or physical address, then the controller 110 may determine that the initial preliminary physical address identifies the physical location in which the most recent version of the data is stored.

Alternatively, if the query of the second set of address data structures returns a second preliminary physical address, then the controller 110 may determine whether the initial preliminary physical address or the second preliminary physical address identifies the location where the most recent version of the data is stored. The controller 110 may be configured to do so in various ways. In one example configuration, the mere return of the second preliminary physical address may indicate that the second preliminary physical address is where the most recent version of the data is stored. In another example configuration, upon return of the second preliminary physical address, the controller 110 may compare the second preliminary physical address with the initial preliminary physical address. If the initial and second preliminary addresses match, then the controller 110 may determine that the initial preliminary physical address identifies the physical location in which the most recent version of the data is stored, and as such is the final physical address. Alternatively, if the initial and second preliminary physical addresses do not match, then the controller 110 may determine that the second preliminary physical address, and not the initial preliminary physical address, is the final physical address.

For some example configurations, a mismatch between the second preliminary physical address and the initial preliminary physical address may imply or indicate that the second preliminary physical address addresses the most recent version of the data. For other example configurations, the address data structures may include additional information or implement various mechanisms, such as pointers or time stamps, to expressly identify whether the second preliminary physical address identifies the physical location of the most recent version of the data.

In addition, for situations where multiple address data structures in a set map to overlapping data, the controller 110 may be configured to first determine which of the mappings in the set identifies the physical location of the most recent version of the data before determining the respective preliminary physical addresses for that set. As an example illustration, suppose GAT Delta and BCI are both included in the second set and each has a logical-physical mapping associated with the logical address information identified in a host read request. From the query of the second set, the controller 110 may first determine whether GAT Delta or BCI identifies a physical address that locates the most recent version of the data, and then use that address as the second preliminary physical address.

As previously described, the controller 110 may initiate the data retrieval process using the initial preliminary physical address prior to determining the final physical address. If the controller 110 has completed performing the pre-sensing actions but has not yet determined the final physical address, then the controller 110 may issue the sense commands to the internal controller 142 in order for the memory module 130 to begin sensing an initial version of copy of the data that is associated with the initial preliminary physical address. Alternatively, if the controller 110 has determined the final physical address before or by the time that pre-sensing has completed, then for some example configurations, the controller 110 may check whether the preliminary physical address initially is the final physical address before issuing the sense commands. If it is, then the controller 110 may proceed to issue the sense commands. If it is not, then the controller 110 may terminate the data retrieval process for the initial preliminary physical address and re-perform the pre-sensing actions using the final physical address (in this case the second preliminary physical address), and subsequently proceed with the sensing and data transfer processes. For other example configurations, the controller 110 may proceed directly to issuing the sense commands associated with the preliminary physical address without checking and/or regardless of whether the final physical address is confirmed. That is, for the other configurations, the controller 110 may confirm whether the preliminary physical address is the final physical address only after it issues the sense commands.

For some example configurations, the controller 110 may be configured to refrain from executing the data transfer process until it confirms whether or not the preliminary physical address is the final physical address. After making the determination, if the initial preliminary physical address is the final physical address, then the controller 110 may transfer the sensed data associated with the initial preliminary physical address. Alternatively, if the controller 110 determines that the final physical address is the second preliminary physical address, then the controller 110 may re-perform data retrieval initiation using the second preliminary physical address and subsequently proceed with the sensing and data transfer processes for the second preliminary physical address.

For other example configurations, the controller 110 may execute the data transfer process to retrieve data stored at the initial preliminary physical address before confirming and/or without regard as to whether the initial preliminary physical address is the final physical address. For example, after issuing the sense command to sense the data, the controller 110 may be configured to execute the associated data transfer command to retrieve the sensed data and store the retrieved data internally in the controller memory 118. Thereafter, the controller 110 may determine whether that retrieved data is the most recent version of the data by confirming the final physical address. If the retrieved data is the most recent version, then the controller 110 may make the retrieved data available for transfer to the host system 101. For example, using the host interface 116, the controller 110 may inform the host system 101 that the retrieved data is ready for transfer and/or allow the host interface 116 to access the retrieved data stored in the controller memory 118 and send the retrieved data to the host system 101. Alternatively, if the controller 110 determines that the initial preliminary physical address is not the final physical address, then the controller 110 may not make the retrieved data available for transmission to the host system 101. For example, the controller 110 may refrain from informing the host system 101 that the retrieved data is ready for transfer and/or not allow the host interface 116 to access the retrieved data stored in the controller memory 118 and send the retrieved data to the host system 101. Instead, the controller 110 may release any resources used to store the retrieved data in the controller memory 118 and re-perform the data retrieval process using the final physical address, which in this case is the second preliminary physical address.

As previously described, the controller 110 may query a first set of one or more address data structures to identify an initial preliminary physical address, and query a second set of address data structures to determine a final physical address. For some example configurations, the first set may include only the primary address data structure. For other example configurations, the first set may include the primary address data structure and at least one but less than all of the secondary address data structures. The second set may include one or more of the secondary address data structures that are not included in the first set. For some example configurations, the second set may include all of the secondary address data structures that are not included in the first set. For other example configurations, the second set may include less than all of the secondary address data structures not included in the first set.

In one particular configuration, the first set of address data structures may include only the primary address data structure (GAT), and the second set may include the master index page (MIP) and the BCI, where the MIP includes cached versions of the GAT and GAT Delta. In an alternative configuration, the first set includes the GAT and the MIP, and the second set includes the BCI. Other configurations or combinations of configurations for the first and second sets comprising some or all of the GAT, MIP, GAT Delta, and BCI may be possible.

In addition, for some example configurations, the controller 110 may be configured to query the first and second sets of address data structures for read operations other than those performed in response to receipt of a host read request. One example read operation may include a background read operation initiated internally by the controller 110 or another component of the storage module 102, rather than in response to receipt of a host read request. The background read operation may be performed as part of a background operation to move stored data to a different location in the memory 132. Various reasons for moving stored data to a different location may exist. For example, the background read operation may be and/or be part of a memory reclamation operation, otherwise referred to as "garbage collection," in which the controller 110 wants to free up storage space and make available an area of the memory 132. To do so, the controller 110 may determine which of the data being stored in that area is valid (i.e., the most recent version) and which is obsolete (i.e., not the most recent version). Upon making the determination, the controller 110 may make a copy of the valid data and move the copy to a new storage location. The original area may then be available for subsequent write and/or programming operations.

Another background operation may include a scrubbing operation in which the controller 110 determines that data being stored in a current area should be moved to a new area because the current area storing the data is defective or the charge being stored to retain the data has degraded. For some scrubbing operations, an error correction process may determine whether the data should be moved, such as if a bit error rate (BER) of the data exceeds a threshold level. If so, then the controller 110 may determine which of the data stored in the current area is valid and which is obsolete before moving the data to the new area. Background operations other than memory reclamation (garbage collection) and scrubbing operations may be possible.

During a background read operation, when the controller 110 determines to move data from a current memory area to a new memory area, the controller 110 may identify logical group information for the data stored in the current memory area. The controller 110 may perform address translation to identify one or more physical locations identifying where the most recent version of the data is stored. For some situations, all of the data stored in the current area may be the most recent version. For other situations, some of the data stored in the current area may be the most recent version (i.e., valid), while other data stored in the current area may not be the most recent version (i.e., obsolete).

To perform address translation and determine which of the data is valid and which is obsolete, the controller 110 may query a first set of address data structures and a second set of address data structures as previously described. In particular, the controller 110 may query a first set of address data structures to determine an initial preliminary physical address associated with the logical group information. Upon determination of the initial preliminary physical address, the controller 110 may be configured to initiate the data retrieval process for data stored at the initial preliminary physical address. For some example configurations, the controller 110 may not retrieve the data and move the data until after the controller 110 performs a query of the second set of address data structures and confirms the final physical address. If the controller 110 determines that the initial preliminary physical address is the final physical address, then the controller 110 may complete the data retrieval process by retrieving the data and moving the data to a new location. Alternatively, if the controller 110 determines that a second preliminary physical address is the final physical address, then the controller 110 may reinitiate the data retrieval process and move data stored at the second preliminary physical address to a new location in the memory 132.

For other example configurations, the controller 110 may retrieve data stored at the initial preliminary physical address but not move the data to a new location in the memory 132 until after the controller 110 performs the query of the second set of address data structures and confirms the final physical address. For still other example configurations, the controller 110 may retrieve the data stored at the initial preliminary physical address and move the data to a new location in the memory 132 before confirming and/or without regard as to whether the initial preliminary physical address is the final physical address. After, if the controller 110 determines that the second preliminary physical address, and not the initial preliminary physical address, is the final physical address, then the controller 110 may retrieve data stored at the second preliminary physical address and move that data to a new location in the memory 132.

In addition, as previously described, the primary and secondary address data structures may be stored in any of various memory locations internal or external to the storage module 102. If the primary or secondary address data structure that the controller 110 wants to query is stored external to the controller 110 (e.g., not in the controller memory 118), then the controller 110 may first access or retrieve the primary or secondary address data structure from the location where it is stored and store it locally (e.g., in the controller memory 118) before the controller 110 can parse it and determine a logical-physical address mapping.

Figure 7A:
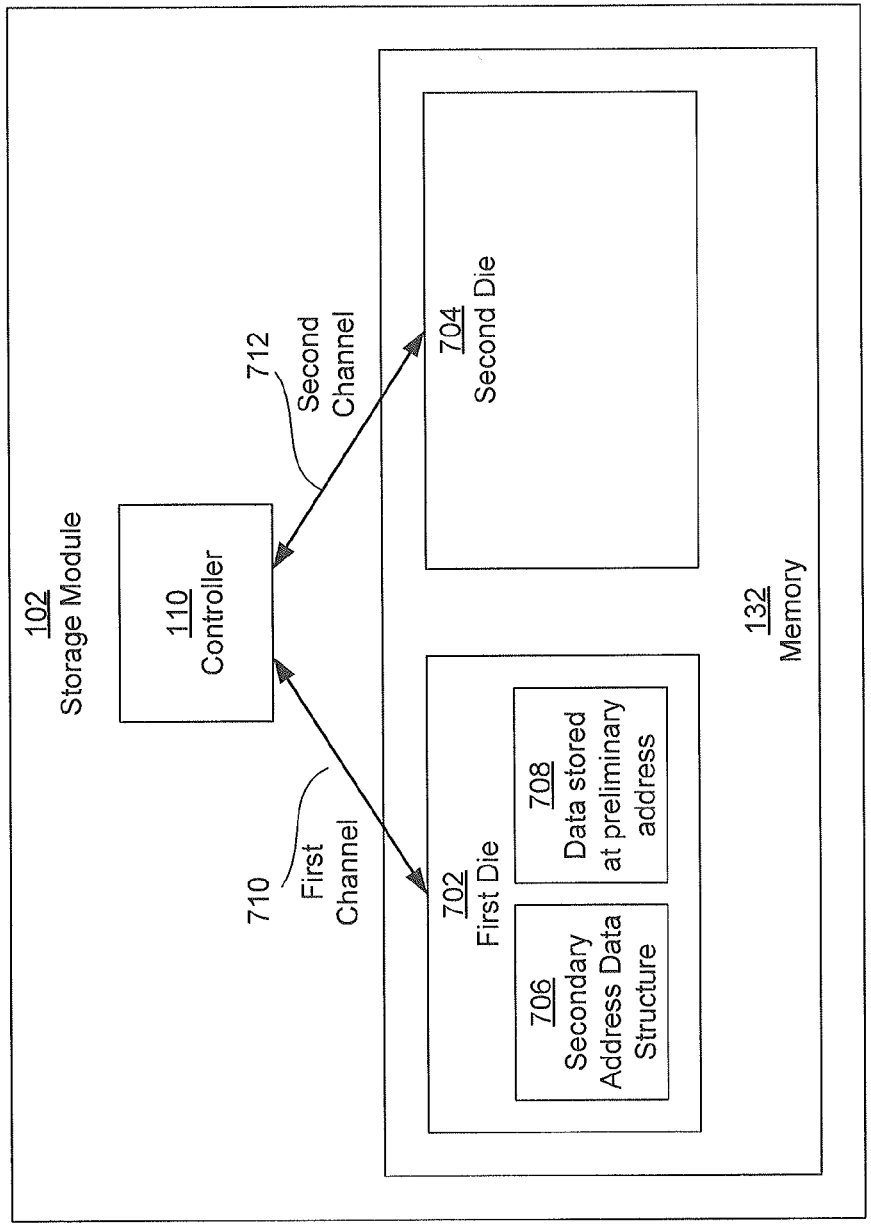
FIG. 7A is a block diagram of the example storage system of FIG. 1, showing a secondary address data structure and data stored at a preliminary physical address located in the same die.
Figure 7B:
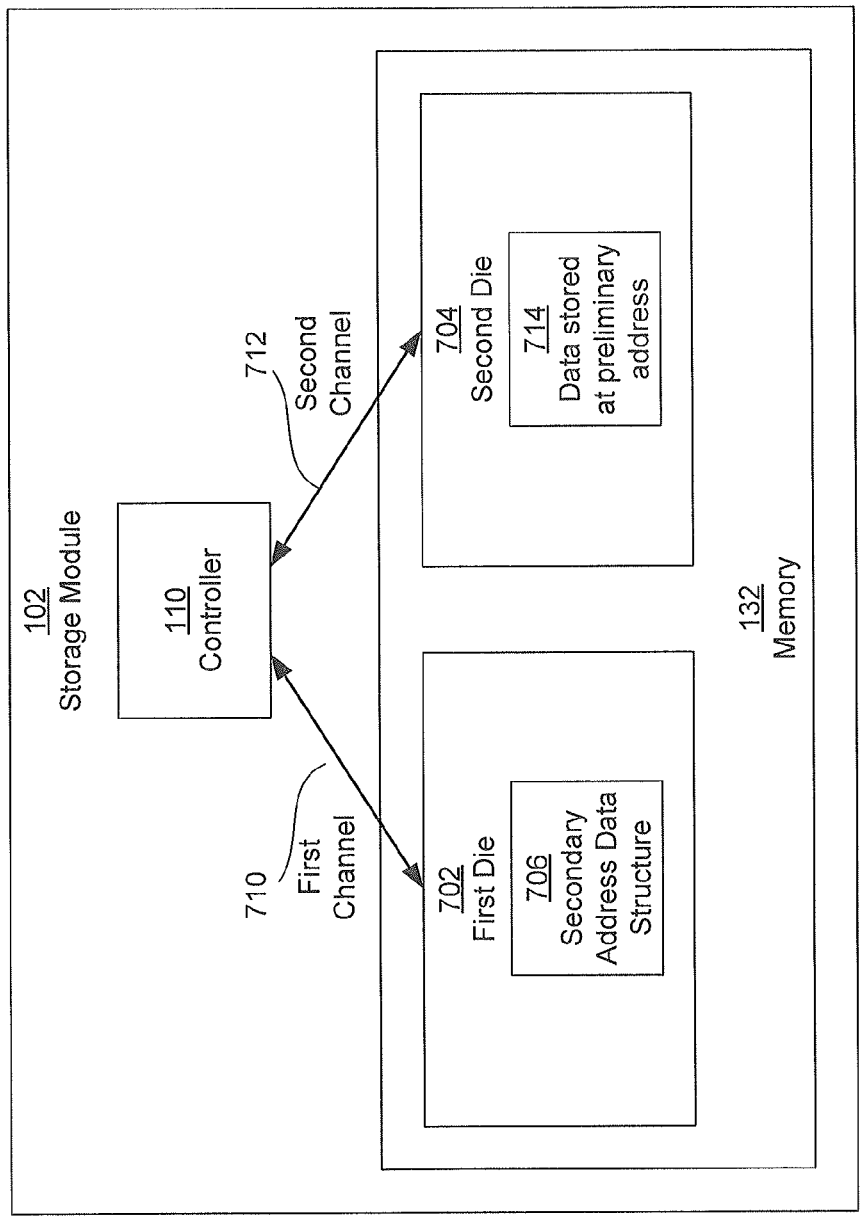
FIG. 7B is a block diagram of the example storage system of FIG. 1, showing a secondary address data structure and data stored at a preliminary physical address located in different dies.

FIGS. 7A and 7B are block diagram of the storage module 102 of FIG. 1, showing different situations where a secondary address data structure to be accessed by the controller 110 is stored in the memory 132, where data associated with a preliminary physical address is also stored. For some example configurations, the memory 132 may include multiple dies, such as a first die 702 and a second die 704. The bus 146 (FIG. 1) may include multiple channels, such as a first channel 710 and a second channel 712, which the controller 110 may use to communicate with the multiple dies 702, 704. In particular, the controller 110 may use the first channel 710 to communicate with the first die 702 and may use the second channel 712 to communicate with the second die 704. Using the multiple channels 710, 712, the controller 110 may concurrently communicate with the multiple dies 702, 704.

If a second address data structure 706 that the controller 110 wishes to query is stored in the memory 132, the controller 110 may handle initiating the data retrieval process for data stored at a preliminary physical address 708 and accessing the secondary address data structure 706 differently, depending on whether the secondary address data structure 706 and the data stored at the preliminary physical address 708 are stored in the same die and/or can be accessed using the same channel, or whether the secondary address data structure 706 and the data stored at the preliminary physical address 708 are stored on different dies and/or can be accessed using different channels.

As shown in FIG. 7A, the secondary address data structure 706 and the data stored at the preliminary physical address 708 may be stored on the same die, i.e., the first die 702, such that the controller 110 may be configured to retrieve both the secondary address data structure 706 and the data 708 using the first channel 710. To handle this situation most efficiently, the controller 110 may be configured to retrieve the secondary address data structure 706 first before initiating the data retrieval for the data 708. In this way, the controller 110 may begin querying the secondary address data structure 706 while initiating the data retrieval process for the data 708 and/or the controller 110 may not have to wait for one or more parts of the data retrieval process to finish before querying the secondary address data structure 706.

In an alternative situation, as shown in FIG. 7B, the secondary address data structure 706 and data stored at a preliminary physical address 714 may be stored in different dies. For example, the secondary address data structure 706 may be stored in the first die 702 and the data stored at the preliminary physical address 714 may be stored in the second die 704. In this situation, the controller 110 may concurrently retrieve the secondary address data structure 706 stored in the first die 702 using the first channel 710 and retrieve the data 714 stored in the second die 704 using the second channel 712.

Figure 8:
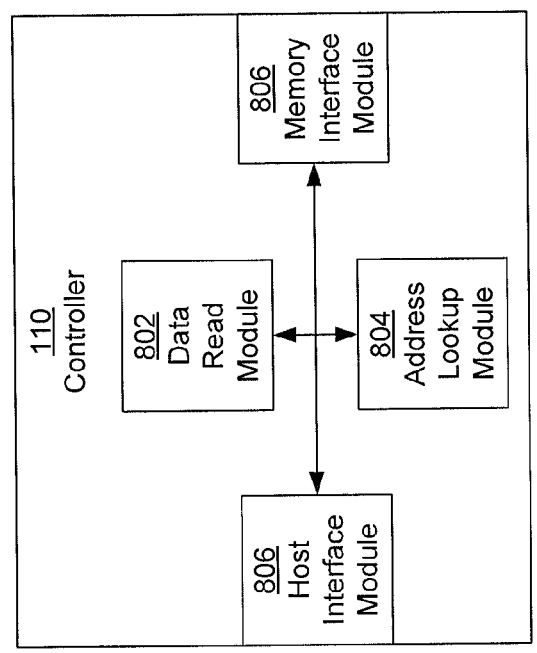
FIG. 8 is a block diagram of an example modular configuration of the controller of the example storage system of FIG. 1.

Referring to FIG. 8, the controller 110 may be configured or arranged with a plurality of modules that are configured to perform a read operation. In one example modular configuration or arrangement shown in FIG. 8, the plurality of modules may include a data read module 802, an address lookup module 804, a host interface module 806, and a memory interface module 808. The address lookup module 804 may be configured to perform the functions and/or operations associated with the address translation process for execution of a host read command. The data read module 802 may be configured to perform the functions and/or operations associated with the data retrieval and host communication processes for execution of a host read command. The data read module 802 and the address lookup module 804 may communicate data and/or other information between each other to perform their respective functions and/or operations. In addition or alternatively, the data read module 802 and/or the address lookup module 804 may communicate with and/or use the host interface module 806, which may be part of the host interface 116 (FIG. 1), to communicate with the host system 101, and/or may communicate and/or use the memory interface module 808, which may be part of the memory interface 114 (FIG. 1), to communicate with the memory module 130. Other example modular configurations or arrangements for the controller 110 may be possible.

In addition, each of the plurality of modules, including the data read module 802, the address lookup module 804, the host interface module 806, and the memory interface module 808, may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware, such as a portion of the controller memory 118 (FIG. 1), for example, that comprises instructions executable with the processor 112 (FIG. 1) or other processor to implement one or more of the features of the module. When any one of the module includes the portion of the memory that comprises instructions executable with the processor, the module may or may not include the processor. In some examples, each module may just be the portion of the controller memory 118 or other physical memory that comprises instructions executable with the processor 112 or other processor to implement the features of the corresponding module without the module including any other hardware. Because each module includes at least some hardware even when the included hardware comprises software, each module may be interchangeably referred to as a hardware module, such as the data read hardware module 802, the address lookup hardware module 804, the host interface hardware module 806, and the memory interface hardware module 808.

Figure 4A:
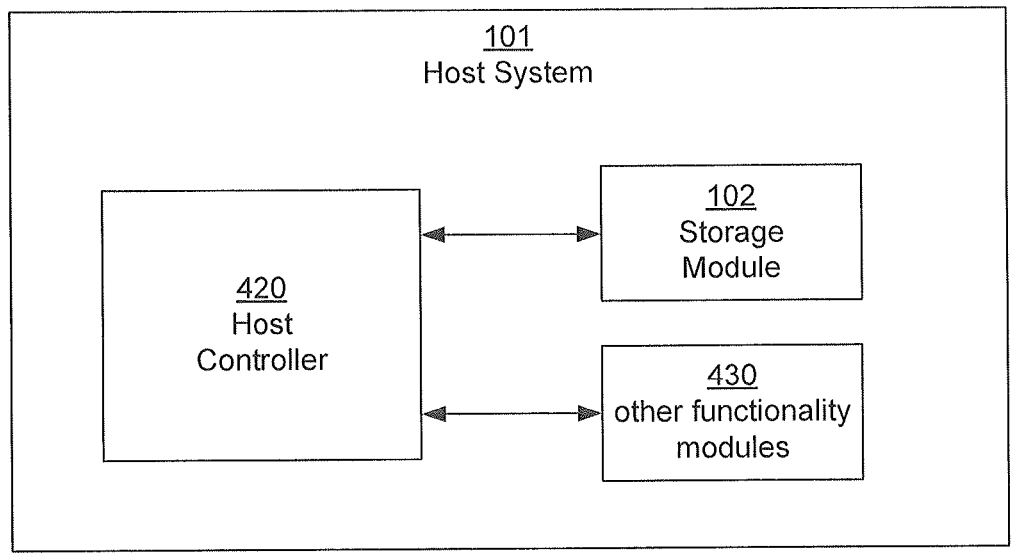
FIG. 4A is a block diagram of the storage module shown in FIG. 1 embedded in a host.
Figure 4B:
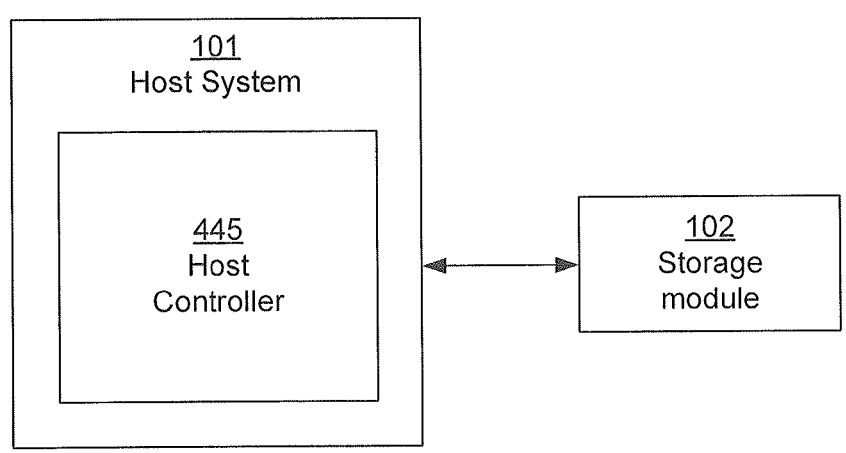
FIG. 4B is a block diagram of the storage module shown in FIG. 1 removably connected with a host.

Referring to FIGS. 4A and 4B, for some example configurations, the storage module 102 may be implemented with the host system 101 by being an embedded device of the host system 101 or by being removably connected with the host system 101. FIGS. 4A and 4B show these implementations. As shown in FIG. 4A, the storage module 102 may be embedded in the host system 101. In addition to embedding the storage module 102, the host system 101 may have a host controller 420. That is, the host system 101 may embody the host controller 420 and the storage module 102, such that the host controller 420 interfaces with the embedded storage module 102 to manage its operations. For example, the storage module 102 can take the form of an iNAND™ eSD/eMMC embedded flash drive by SanDisk Corporation. The host controller 420 may interface with the embedded storage module 102 using the host interface 116 (FIG. 1). Additionally, when the storage module 102 is embedded in the host system 101, some or all of the functions performed by the controller 110 in the storage module 102 may instead be performed by the host controller 420.

The host system 410 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 4A, the host system 101 can include optional other functionality modules 430. For example, if the host system 101 is a mobile phone, the other functionality modules 430 can include hardware and/or software components to make and place telephone calls. As another example, if the host system 101 has network connectivity capabilities, the other functionality modules 430 can include a network interface. These are just some examples, and other implementations can be used. Also, the host system 101 can include other components (e.g., an audio output, input-output ports, etc.) that are not shown in FIG. 4A to simplify the drawing.

In an alternative configuration shown in FIG. 4B, instead of being an embedded device in a host system, the storage module 102 may have physical and electrical connectors that allow the storage module 102 to be removably connected to the host system 101 (having a host controller 445) via mating connectors. As such, the storage module 102 may be a separate device from (and is not embedded in) the host system 101. In this example, the storage module 102 can be a removable memory device, such as a Secure Digital (SD) memory card, a microSD memory card, a Compact Flash (CF) memory card, or a universal serial bus (USB) device (with a USB interface to the host), and the host system 102 is a separate device, such as a mobile phone, a tablet computer, a digital media player, a game device, a personal digital assistant (PDA), a mobile (e.g., notebook, laptop) personal computer (PC), or a book reader, for example.

Additionally, referring to FIG. 1, the memory 132 may be a semiconductor memory device that includes volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Figure 5:
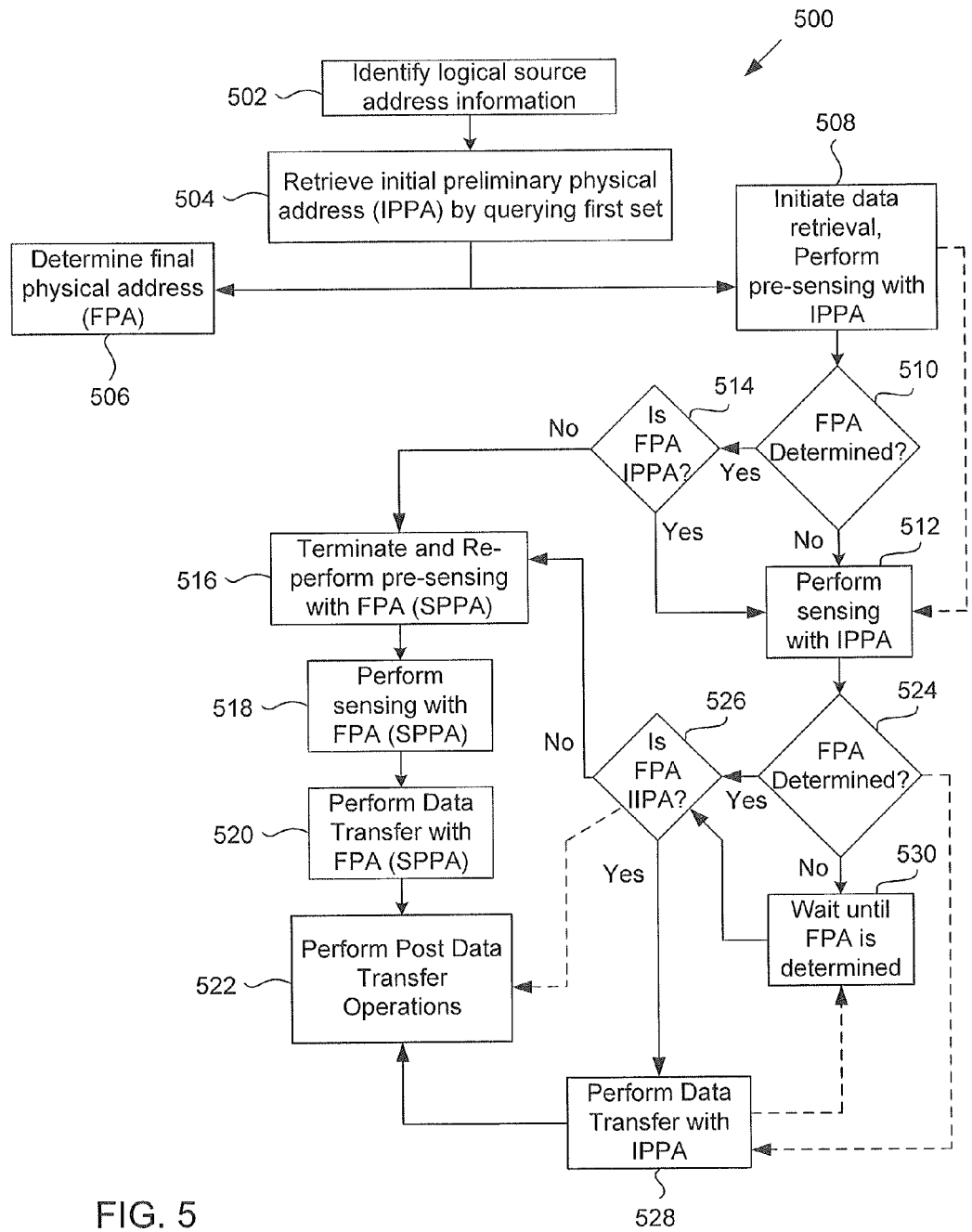
FIG. 5 is a flow chart of a method of performing a read operation.

FIG. 5 shows an example method 500 of a storage module performing a read operation. At block 502, a controller of the storage module may identify logical address information associated with data to be read. The logical address information may be included and/or associated with a host read command received by the storage module via a host interface. Alternatively, the logical address information may be identified as part of a background operation performed by the controller, as previously described.

At block 504, the controller may retrieve an initial preliminary physical address (IPPA) associated with the logical address information. To do so, the controller may query a first set of one or more address data structures to obtain the initial preliminary physical address (IPPA). As previously described, each of the address data structures may provide a logical-physical mapping that maps the logical address information to a physical address identifying a physical location in the storage module in which the data is stored. The first set may include only a primary address data structure. Alternatively, the first set may include the primary address data structure and at least one but less than all secondary address data structures. If an address data structure in the first set is not stored locally, the controller may first retrieve it before querying it. Additionally, for some example methods, before querying the first set, the controller may perform a front-end parsing operation which translates logical block addresses (LBAs) included in the host read request into associated logical group and offset information, as previously described.

At block 506, the controller may determine a final physical address (FPA), and at block 508, the controller may initiate a data retrieval process to retrieve data stored at the initial preliminary physical address. The controller may initiate the data retrieval process at block 510 prior to concluding the determination of the final physical address at block 508.

Figure 6:
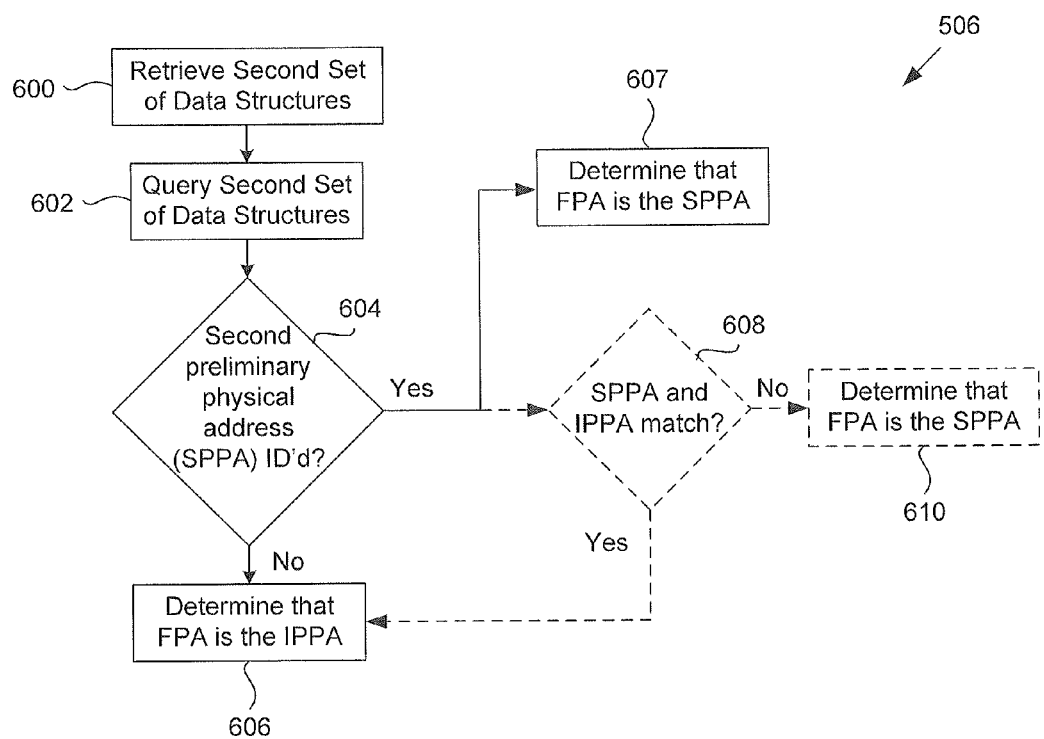
FIG. 6 is a flow chart of a method of determining a final physical address.

FIG. 6 shows a flow chart of an example method of determining the final physical address (block 506 in FIG. 5) in more detail. At block 600, the controller may retrieve any address data structures in the second set that are not stored locally. As previously described, the controller may use multiple channels to communicate with different parts (e.g., dies) of the memory. If the controller uses the same channel to both retrieve an address data structure in the second set and initiate the data retrieval process at block 508, then for some example methods, the controller may first use the channel to retrieve the address data structure before initiating the data retrieval process. For other example methods, the controller may initiate the data retrieval process at block 508 first, and then retrieve the address data structure.

Alternatively, if the channel that the controller uses to initiate the data retrieval process is not also used to retrieve the address data structure, then the controller may initiate the data retrieval process at block 508 without first using the channel to retrieve the address data structure. If the controller uses a different channel to access the address data structure, then the controller may initiate the data retrieval process at block 508 on one channel and retrieve the address data structure at block 600 on another channel either concurrently or perform one process before the other. Still alternatively, if the address data structure is located external to the storage module, such as in the host system, then the controller may initiate the data retrieval process at block 508 and retrieve the address data structure at block 600 either concurrently or one before the other.

At block 602, the controller may query the second set of address data structures. The second set may include one or more of the secondary address data structures that are not included in the first set, which may include all or less than all of the secondary address data structures that are not included in the first set. In response to the query, the second set of address data structures may return information indicating whether a second preliminary physical address (SPPA) is included in the second set of address data structures and if so, whether the SPPA identifies a physical location in which the most recent version of the data requesting to be read is stored.

At block 604, if the query of the second set of address data structures indicates that there is not a second preliminary physical address in the second set, then at block 606, the controller may determine that the final physical address is or matches the preliminary physical address as initially determined at block 504 (FIG. 5). Alternatively, at block 604, if the query of the second set of address data structures returned a second preliminary physical address, then at block 607, the controller may determine that the final physical address is second preliminary physical address without further analysis. That is, the return of the second preliminary physical address in and of itself may indicate to the controller that the final physical address is the second preliminary physical address.

Alternatively, as denoted by dotted lines in FIG. 6, even if the query of the second set of address data structures returns a second preliminary physical address, the controller may still perform further analysis to determine the final physical address. In the alternative portion of the method, if the query of the second set of address data structures returns a second preliminary physical address at 604, then at block 608, the controller may compare the initial and second preliminary physical addresses to determine whether they match. If they do match, the method may proceed back to block 606, where the controller may determine that the final physical address is the initial preliminary physical address. Alternatively, if they do not match, then at block 610, the controller may determine that the final physical address is the second preliminary physical address instead of the initial preliminary physical address.

Referring back to FIG. 5, concurrent with determining the final physical address at block 506, the controller may initiate the data retrieval process using the initial preliminary physical address at block 508. To initiate the data retrieval process, the controller may begin performing pre-sensing actions. At block 510, the controller may determine whether the final physical address has been determined. For some example methods, the controller may make the determination at block 510 only after completing all of the pre-sensing actions. Alternatively, the controller may make the determination at block 510 before completing the pre-sensing actions. That is, the controller may check whether the final physical address has been determined any number of times while performing and/or prior to completing the pre-sensing actions. Still alternatively, the controller may skip the determination at block 510 and proceed directly to issuing sense commands for the initial preliminary physical address at block 512, as denoted by the dotted arrow connecting blocks 508 and 512.

If the controller does determine whether the final physical address has been determined at block 510 and determines that is has not, then the method may proceed to block 512, where sensing may be performed to sense data associated with the initial preliminary physical address. Alternatively, if the final physical address has been determined, then at block 514, if the final physical address is the initial preliminary physical address, then the method may proceed back to block 512 where sensing may be performed to sense data associated with the initial preliminary physical address. Alternatively, if at block 514 the final physical address is not the initial preliminary physical address, then the method may proceed to block 516.

At block 516, the controller may terminate the current data retrieval process for the initial preliminary physical address and re-perform the pre-sensing actions using the second preliminary physical address (SPPA) since the controller determined that the final physical address is the second and not the initial preliminary physical address. At block 518, sensing may be performed to sense data associated with the second preliminary physical address. At block 520, the controller may perform data transfer to transfer the data that was sensed and stored in latches in the memory over to the controller via a communications bus. At block 522, after the data transfer operation, any post data transfer operations may be performed. For example, if the read operation is being performed in response to a host read command, then the data may be communicated to the host system to complete execution of the host read command. As another example, if the read operation is being performed as part of an internal background operation, then the post data transfer operations may include writing the data to a new location in the memory.

Referring back to block 512, after sensing data associated with the initial preliminary physical address, the controller may determine at block 524 whether the final physical address has been determined. If it has, then at block 526, if the final physical address is the initial preliminary physical address, then the method may proceed to block 528, where data transfer is performed to transfer the data associated with the initial preliminary physical address sensed at block 512 to the controller and complete the data retrieval process. After performing data transfer at block 528, the method may proceed to block 522 where any post data transfer operations may be performed. Alternatively, at block 526, if the final physical address is not the initial preliminary physical address, then the method may proceed to block 516, where the controller re-performs pre-sensing actions using the second preliminary physical address as the final address.

Referring back to block 524, after sensing data associated with the initial preliminary physical address at block 512, if the controller has not yet determined the final physical address, then for some example methods, at block 530, the controller may suspend any further data retrieval operations until the final physical address is determined. In other words, after the controller has issued sense commands to have data associated with the initial preliminary physical address sensed, the controller may refrain from executing any data transfer commands or otherwise transferring the sensed data until after it determines the final physical address at block 506. For other example methods, at block 524, even if controller has not yet confirmed the final physical address or regardless of whether the controller has confirmed the final physical address, the method may proceed from block 524 directly to block 528, as denoted by the dotted arrow connecting block 524 with block 528, where the controller may transfer the sensed data associated with the initial preliminary physical address at block 528. The method may then proceed to block 538 where the controller waits until the final physical address is determined, as denoted by the dotted arrow connecting block 528 with block 530. Once the final physical address is determined, then at block 526, if the final physical address if the initial preliminary physical address, then the method may proceed to block 522, as denoted by the dotted arrow connecting block 526 with block 522, where the controller performs post data transfer operations. Alternatively, at block 530, if the controller determines that the final physical address is not the initial preliminary physical address, the controller may remove any data buffered as a result of the data transfer, free up any resources used to buffer the data, and re-perform the data retrieval process using the second preliminary physical address at blocks 516-520.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

I claim:

1. A storage system comprising:
   at least one memory; and
   control circuitry in communication with the at least one memory, wherein the control circuitry, in order to perform a read operation to read data stored in the at least one memory, is configured to:
      identify logical address information associated with the data;
      retrieve a first physical address associated with the logical address information from a first address data structure of a plurality of address data structures;
      initiate a data retrieval process of the read operation for a first version of the data stored at the first physical address;
      retrieve a second physical address associated with the logical address from a second data structure of the plurality of address data structure;
      when the second physical address matches the first physical address, complete the read operation using the first version of the data; and
      when the second physical address does not match the first physical address, terminate the initiated data retrieval process and initiate a subsequent data retrieval process for a second version of the data stored at the final physical address.

2. The storage system of claim 1, wherein the first address data structure comprises a primary address data structure.

3. The storage system of claim 1, wherein the plurality of address data structures comprises a primary address data structure and a plurality of secondary address data structures, wherein the first address data structure comprises the primary address data structure or a first secondary address data structure of the plurality secondary address data structure, and wherein the second address data structure a second secondary address data structure of the plurality of secondary address data structures.

4. The storage system of claim 1, wherein the first physical address comprises a first preliminary physical address, and wherein the control circuitry is further configured to:
   determine that the second physical address matches the first preliminary address when the query of the second address data structure returns either mapping information identifying that the second address data structure does not have a logical-physical address mapping associated with the logical address information or a second preliminary physical address that matches the first preliminary physical address; and
   determine that the second physical address does not match the first preliminary physical address when the query of the second address data structure returns the second preliminary physical address and the second preliminary physical address does not match the first preliminary physical address.

5. The storage system of claim 1, wherein the at least one memory comprises a first memory and a second memory, the first memory configured with a higher bit-per-cell storage density than the second memory,
   wherein the first address data structure provides logical-physical address mapping for the first memory, and
   wherein the second address data structure provides logical-physical address mapping for the second memory.

6. The storage system of claim 1, wherein the second address data structure tracks changes to entries in the first address data structure.

7. The storage system of claim 1, wherein the at least one memory comprises a local memory that is internal to the controller, and wherein the second address data structure identifies whether a most recent version of the data is stored in the local memory.

8. The storage system of claim 1, wherein the control circuitry is further configured to:
   communicate with the at least one memory using a plurality of different channels;
   retrieve the second address data structure before initiating the data retrieval process when the control circuitry uses a same channel of the plurality of different channels to retrieve the second address data structure and initiate the data retrieval process.

9. The storage system of claim 1, wherein the control circuitry is further configured to:
   concurrently initiate the data retrieval process using a first channel and retrieve the second address data structure using a second channel.

10. The storage system of claim 1, wherein the control circuitry is further configured to receive, from a host system, a host read request identifying the logical address information,
   wherein when the second physical address matches the first physical address, the control circuitry is further configured to send the first version of the data to the host system to complete the read operation.

11. The storage system of claim 1, wherein the read operation comprises a background read operation, wherein the control circuitry is further configured to: identify the logical address information as part of the background read operation, and send the data to a new location in the at least one memory to complete the background read operation.

12. The storage system of claim 1, wherein one or more of the at least one memory comprises three-dimensional memory.

13. The storage system of claim 1, wherein the control circuitry is on the same substrate as memory elements of the at least one memory.

14. The storage system of claim 1, wherein the control circuitry is further configured to confirm a final physical address associates with the logical address information based on the retrieval of the second physical address from the second data structure.

15. The storage system of claim 14, wherein the control circuitry is further configured to send to the at least one memory one or more sense commands that instruct the at least one memory to sense the first version of the data stored at the first physical address before confirming the final physical address.

16. The storage system of claim 14, wherein the control circuitry is further configured to:
confirm the final physical address prior to completion of the data retrieval process for the first version of the data at the first physical address.

17. The storage system of claim 14, wherein the control circuitry is further configured to:
complete the data retrieval process for the first version of the data at the first physical address prior to confirmation of the final physical address.

18. A method of accelerating a logical-to-physical address translation, the method comprising:
performing in a storage system having at least one memory:
receiving, from a host system, a host request identifying logical address information for data stored in the at least one memory;
reading a preliminary physical address associated with the logical address information from a first data structure of a plurality of address data structures;
initiating a data retrieval process for a first version of the data stored at the preliminary physical address prior to confirming a final physical address associated with the logical address information;
while continuing with the data retrieval process, querying a second address data structure of the plurality of address data structures to confirm the final physical address, the second address data structure different from the first address data structure; and
when the final physical address does not match the preliminary physical address, terminating the initiated data retrieval process and initiating a subsequent data retrieval process for a second version of the data stored at the final physical address.

19. The method of claim 18, wherein the first address data structure comprises a primary address data structure, and the second address data structure comprises a secondary address data structure.

20. The method of claim 18, wherein the preliminary physical address comprises a first preliminary physical address, and wherein the method further comprises:
in the storage system:
determining that the final physical address matches the first preliminary address when querying the second address data structure returns either mapping information identifying that the second address data structure does not have a logical-physical address mapping associated with the logical address information or a second preliminary physical address that matches the first preliminary physical address; and
determining that the final physical address does not match the first preliminary physical address when the second address data structure returns the second preliminary physical address and the second preliminary physical address does not match the first preliminary physical address.

21. The method of claim 18, wherein the at least one memory comprises a first memory and a second memory, the first memory configured with a higher bit-per-cell storage density than the second memory,
wherein the first address data structure provides logical-physical address mapping for the first memory; and
wherein the second address data structure provides logical-physical address mapping for the second memory.

22. The method of claim 18, wherein the second address data structure tracks changes to entries in the first address data structure.

23. The method of claim 18, further comprising:
retrieving, with the controller, the second address data structure using a channel before initiating the data retrieval process using the channel.

24. The method of claim 18, further comprising:
concurrently initiating the data retrieval process using a first channel and retrieving the second address data structure using a second channel.

25. The method of claim 18, further comprising:
in the storage system:
confirming the final physical address prior to completing the data retrieval process for the first version of the data at the preliminary physical address.

26. The method of claim 18, further comprising:
in the storage system:
completing the data retrieval process for the first version of the data at the preliminary physical address prior to confirming the final physical address.

* * * * *